United States Patent [19]
Van Koevering et al.

[11] 3,718,978
[45] March 6, 1973

[54] PIPELINE SURVEY VEHICLE

[76] Inventors: Barry D. Van Koevering, 211 Russell Street; William M. Blough, Jr., 313 W. Bennett Street, both of Saline, Mich. 48176; Fred H. Bunnell, 719 Woodfield Dr., Jackson, Mich. 49203; William B. McDowell, 7416 Ledgewood Dr., Fenton, Mich. 48430; George E. McDowell, 1730 Ivywood, Ann Arbor, Mich. 48103

[22] Filed: Oct. 16, 1970

[21] Appl. No.: 81,261

[52] U.S. Cl. ............33/174 L, 33/174 R, 138/97, 104/138
[51] Int. Cl. ....................G01b 7/28, G01b 7/34
[58] Field of Search ....33/46 AT, 1 H, 174 R, 174 X, 33/174 L; 318/587, 588, 648; 104/138 R; 138/97 R; 180/96, 79

[56] References Cited

UNITED STATES PATENTS

| | | | |
|---|---|---|---|
| 3,099,227 | 7/1963 | Bryan | 104/139 |
| 2,604,521 | 7/1952 | Boucher | 104/138 R |
| 2,897,779 | 8/1959 | Perkins | 104/139 |
| 2,742,259 | 4/1956 | Boucher | 104/138 R |
| 3,495,340 | 2/1970 | Bunnell | 33/174 R |
| 956,952 | 5/1910 | Emden | 180/96 |
| 2,962,642 | 11/1960 | Brane | 318/587 |
| 3,183,017 | 5/1965 | Lundquist | 104/138 R |
| 3,271,650 | 9/1966 | Riddle | 318/648 |

FOREIGN PATENTS OR APPLICATIONS

| 1,084,801 | 7/1960 | Germany | 104/138 R |
|---|---|---|---|

Primary Examiner—Leonard Forman
Assistant Examiner—Paul G. Foldes
Attorney—Beaman & Beaman

[57] ABSTRACT

The invention is directed to a vehicle adapted to be inserted within a pipeline or conduit, such as a buried gas main, having pipeline characteristic sensing means mounted upon the vehicle for sensing the pipe deflection in a vertical plane, leaks, cracks, corrosion or other pipeline characteristics. The vehicle is self-propelled and is self-steering. Self-steering is accomplished by means of a gravity operated sensing device which will maintain the vehicle in a predetermined vertical orientation at all times. Traction of the vehicle drive wheels is augmented by friction producing means engaging the upper region of the pipe and biasing the drive wheels into firm engagement with the pipe lower region inner surface. Control of the vehicle and recording of the pipeline characteristics is achieved remotely through electric conductors affixed to the vehicle.

17 Claims, 15 Drawing Figures

PIPELINE SURVEY VEHICLE

BACKGROUND OF THE INVENTION

The invention pertains to vehicles capable of being inserted in buried or submerged pipelines and conduits wherein the vehicle moves through the pipeline under its own power and internally senses characteristics of the pipeline in order to determine conduit bending, leakage, joint locations, internal surface condition of the pipe, mechanical inhomogenieties and discontinuities or the like.

In the transportation of natural gas, water, petroleum products, and other gases and fluids, the use of pipelines, often of considerable length, is common. Cross-country pipelines are, of course, of large diameter such as of 12 inches, 24 inches and 30 inches capacity. Such pipeline sizes are usually associated with the transporting of natural gas, and large sizes of pipe are normally fabricated of steel. In urban areas distribution of natural gas, and the distribution of manufactured gas in previous years, was accomplished through vast networks of smaller size buried pipe, of the 4-inch and 6 inch diameter. While present installation of underground pipe, particularly for natural gas, of the 4-inch and 6 inch diameter size, utilizes steel, many hundreds of miles of cast iron pipe have been installed and buried over the years, and are presently being utilized for the delivery of natural gas, particularly in urban areas.

While cast iron has excellent resistance to corrosion, it has a relatively low resistance to bending forces without fracturing, and for this reason cast iron pipe as used in the transmission of natural or manufactured gas is not considered as safe as steel pipe. Economically, it is not feasible to remove or cease using the cast iron pipe presently in use, but from a safety standpoint it is important to know the condition of the pipe whereby trouble spots can be predicted, and localized sections of pipe can be replaced if it appears that an unsafe condition exists.

The most common problem encountered with buried cast iron pipe arises from the deflection of the pipe caused by settling of the earth about the pipe, heaving due to frost, or forces applied to the earth thereabove. In the installation of cast iron pipe it is conventional to support the ends or flanges of the pipe upon blocks or the like prior to backfilling the trench. By supporting the ends of each pipe section in this manner the relatively "unsupported" central portion of the pipe is capable of deflecting downwardly if the trench is not properly backfilled. Additionally, when the pipe is buried in soft, wet or shifting ground areas, forces may be imposed upon the pipe over the years which produce considerable deflection. Furthermore, heaving caused by freezing will cause the pipe to move, once buried, and can cause fracturing thereof.

The previous manner for determining the amount of deflection existing in a buried conduit was to dig down to the pipe and by the use of surveying equipment determine if a sag or deflection exists in the pipe which is of such a degree as to warrant pipe replacement. This method of pipeline surveying is very expensive and time consuming.

It has been proposed by one of the inventors of the instant invention, Fred H. Bunnell, to survey buried pipeline for vertical deflection and bending by inserting a survey vehicle inside the pipeline having gauging or sensing means located thereon capable of sensing vertical pipe deflection. This process is a considerable improvement over conventional pipe surveying methods and apparatus, and even permits the surveying of pipe, in situ, that are buried below streets and the like, and which are not otherwise susceptible to conventional surveying processes. Additionally, by surveying the pipe internally, very accurate results can be obtained at a much more economical cost, and much more rapidly, than with known surveying techniques. The basic concepts of this type of pipe surveying are disclosed in U.S. Pat. No. 3,495,340.

The pipeline survey vehicle disclosed in the aforementioned patent was intended to be pulled through the pipe, and while means are employed on the patented vehicle for determining the vertical orientation of the same, steering means were not incorporated to assure vertical orientation at all times. In that the bending of the pipe which is of significance occurs in a vertical plane, continuous surveying can be accomplished if the vehicle always maintains a vertical orientation, and the instant invention is directed to a vehicle having this capability.

Additionally, the number of openings that must be made in the pipeline in order to insert the survey vehicle can be substantially reduced if the vehicle is self-propelled. A self-propelled vehicle is capable of moving away from the pipe entrance opening, as well as reversing its direction for removal purposes, which greatly adds to the versatility and ease of use and operation of the apparatus.

SUMMARY OF THE INVENTION

It is an object of the invention to produce a pipeline survey vehicle capable of surveying buried pipe wherein the vehicle is self-steering and self-propelled, and is capable of maintaining a predetermined orientation to the vertical at all times.

Another object of the invention is to provide a pipeline survey vehicle which is capable of passing around curves and bends of the pipe, even though the length of the vehicle is several times its cross-sectional transverse dimension. To this end the vehicle body is articulated, to define two portions relatively pivotal to each other about a vertical axis. Biased aligning means are employed to bias the vehicle body portions toward an aligned linear relationship with each other, and guide roller elements are mounted upon the lateral sides of the vehicle to facilitate pivoting of the body portions as a curve or bend is traversed.

The vehicle is self-propelled by means of a motor mounted upon the vehicle body drivingly connected to drive wheels. The driving relationship between the drive wheels and the lower region of the pipe inner surface produced by the weight of the vehicle bearing on the drive wheels is augmented, and the friction therebetween is increased, by means of spring biasing means disposed vertically above the drive wheels and engaging the upper regions of the pipe inner surface forcing the drive wheels into engagement with the pipe.

When sensing the bending characteristics of pipe sections within pipeline, it is important that the measurements be taken in a substantially vertical plane in that it is this plane in which the significant bending or pipe deformation takes place. In order to maintain a vertical orientation and to permit the continuous engaging of the pipeline for gauging, if desired, automatic steering means are associated with the vehicle. The steering means includes a gravity operated device, such as a pendulum operated potentiometer, capable of sensing vertical orientation of the vehicle, and the pendulum device is electrically connected to an electric steering motor capable of rotating the front steering wheels about a vertical axis. The position of the front wheels is sensed by a linear variable differential transformer, and by an interconnection of the electrical components of the apparatus very accurate and sensitive steering may be accomplished.

Pipelines often include protrusions extending into the pipe, such as produced by a service fitting passing through the top of the pipe, and in the event the gauging apparatus encounters such a protrusion, movement of the vehicle ceases and the gauging apparatus may be retracted to pass by the obstruction.

In order to determine bending within the pipe through which the vehicle passes, the upper region of the pipe inner surface is contacted by gauge elements having a predetermined orientation to each other. By comparing the orientation of these gauge elements as determined by the configuration of the pipeline upper inner surface, an accurate determination of deflection existing in the pipeline due to bending can be made. The gauge elements are mounted upon a gauge bar which is selectively raised and lowered from proximity with the pipeline upper surface and the raising and lowering of the gauge bar and elements is accomplished through an electric motor controlled by limit switches associated therewith. Should the gauge bar and elements be depressed toward the vehicle due to external forces, the gauge bar elevating and retracting motor is electrically connected to a compression sensing switch which is capable of sensing externally originated forces upon the gauge bar, permitting the gauge bar to retract or readjust itself automatically under such conditions to protect the apparatus and achieve uniform gauging readings.

The electrical controls associated with the vehicle permit a wide variety of controllable functions of the vehicle, and the remote control of the vehicle is accomplished, for example, through electrical conductors interposed between the vehicle and a control console located outside of the pipeline. The size of the pipeline survey vehicle is such as to permit pipelines of 4-inch or 6 inch internal diameter to be readily inspected, and it is anticipated that the inventive concepts may be used with smaller or larger pipe sizes.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
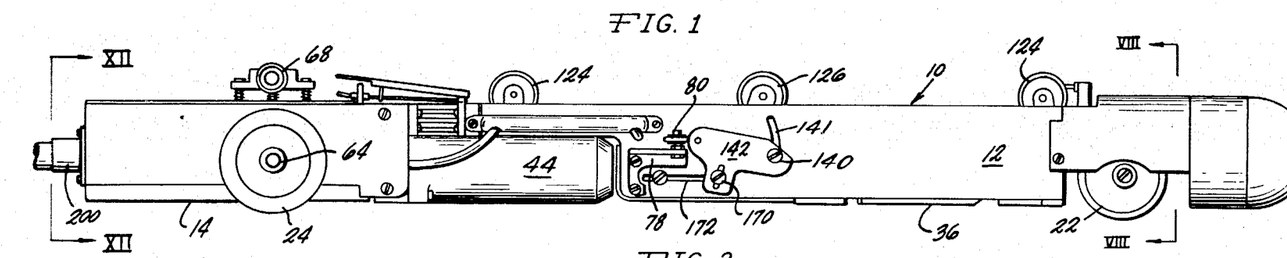
FIG. 1 is an elevational view of a pipeline survey vehicle constructed in accord with the invention as taken from the right side thereof, the gauge bar being retracted.
Figures 2, 12, 15:
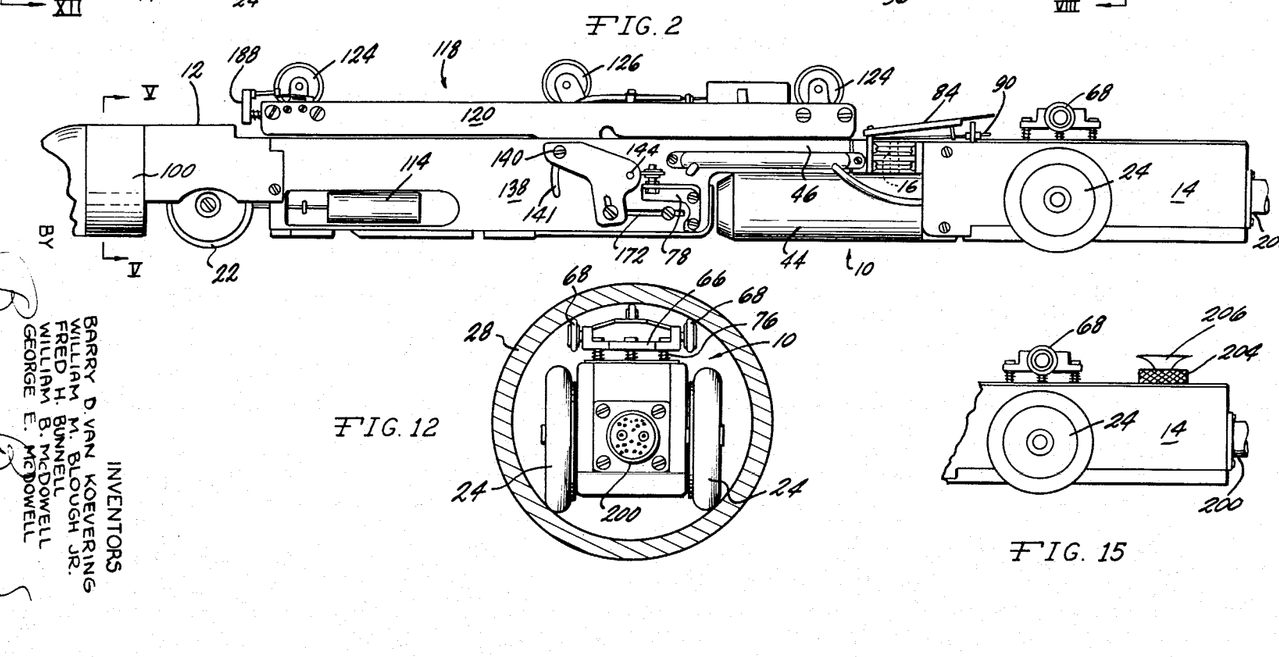
FIG. 2 is a left elevational view of the survey vehicle showing the gauge bar in the raised position.
FIG. 12 is an elevational, sectional view taken through a pipeline containing the vehicle looking toward the rear thereof, the control conductors normally connected to the vehicle being removed for purpose of illustration.
FIG. 15 is a detail, elevational view of a vehicle rear portion constructed in accord with the invention illustrating the mounting of a leak detecting microphone located thereon.
Figures 3, 4, 5, 6, 7:
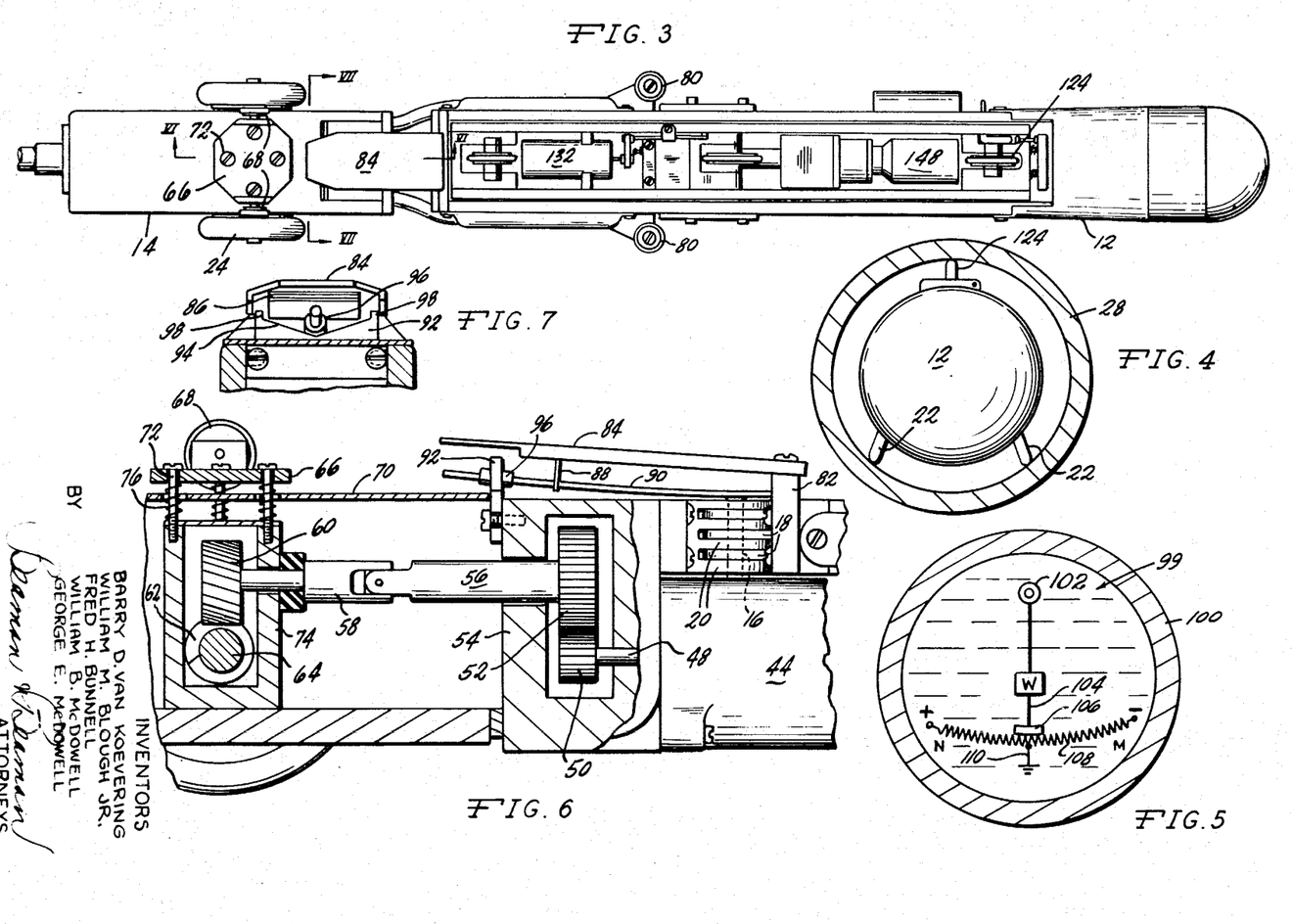
FIG. 3 is a top plan view of the vehicle.
FIG. 4 is an elevational, sectional view as taken through a pipeline containing the survey vehicle looking toward the front portion thereof.
FIG. 5 is an elevational, sectional view taken through the vertical sensing apparatus mounted on the vehicle as taken along Section V—V of FIG. 2.
FIG. 6 is an enlarged, detail, elevational, sectional view of the drive wheel transmission taken along Section VI—VI of FIG. 3.
FIG. 7 is an enlarged, detail, sectional view of the spring biased alignment device as taken along Section VII—VII of FIG. 3.

The overall configuration of a pipeline survey vehicle constructed in accord with the invention is best appreciated from FIGS. 1 through 3. The vehicle 10 consists of a front or forward portion 12, and a rear portion 14. The portions 12 and 14 are interconnected for relative pivoting to each other about a pivot pin 16, FIGS. 2 and 6, associating with meshing hinge elements 18 and 20 mounted upon the front and rear portions 12 and 14, respectively. The hinge elements 18 and 20 are closely superimposed in an alternate manner on each other to form a strong and accurate hinge permitting the vehicle to pivot in a "horizontal" plane perpendicular to the axis of the pivot pin 16, but preventing "sagging" of the vehicle due to the pivotal interconnection of the forward and rear portions.

The front portion 12 of the vehicle is supported upon the front steerable wheels 22, while the drive wheels 24 rotatably mounted upon the rear portion 14 provide the traction and self-propelling feature of the vehicle. The wheels preferably include a rubber tire or outer portion capable of having a high friction contact with the lower region of the pipe inner surface.

Figure 8:
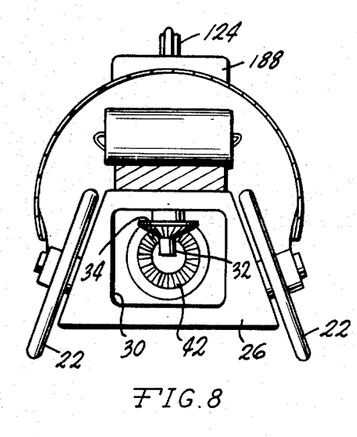
FIG. 8 is an elevational, detail, enlarged sectional view taken through the front of the vehicle illustrating the front axle and associated components as taken along Section VIII—VIII of FIG. 1.

The front wheels 22 are rotatably mounted upon an axle member 26 having obliquely disposed sides from which the wheel axles extend. In this manner the steering wheels are obliquely related to each other in an inverted V relationship as to effectively engage the inner surface of the pipe 28 through which the vehicle is moving as will be appreciated in FIG. 4. The axle member 26 has an opening 30, FIG. 8, centrally defined therein, and the lower end of the vertically disposed pivot 32 for the steering components extends from the front portion 12 and terminates in this opening. A bevel gear 34 is also located within the opening 30 about the pivot pin 32 and is fixed to the axle 26.

Figure 9:
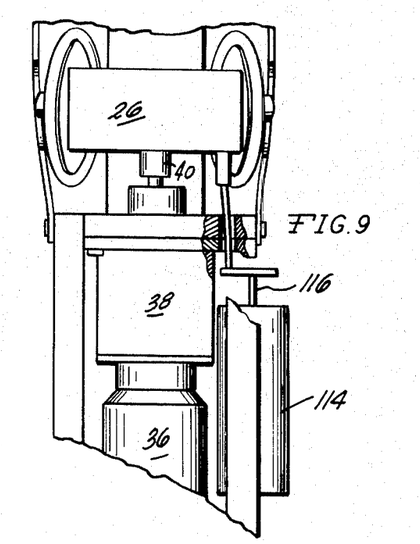
FIG. 9 is a detail, enlarged, partly sectioned view of the underside of the front end of the vehicle illustrating the front axis and the association therewith with the linear variable differential transformer.

Steering is achieved by an electric motor 36 mounted upon the front portion 12 behind the front wheels, FIG. 9, having a speed reduction transmission unit 38 affixed thereto. The output shaft 40, FIG. 9, of the transmission terminates in a bevel gear 42, FIG. 8, which meshes with the front axle gear 34. Thus, energization of the motor 36 will cause a rotation of the gear 34, and a rotation of the axle 26 to steer the vehicle. Of course, the transmission 38 reduces the angular velocity of the output shaft 40 considerably such that rotation of the axle may be very accurately controlled by energization of the steering motor. The motor 36 is of the reversible type to permit steering in either direction about the axle pivot 32.

The motivation and self-propulsion of the vehicle occurs through the driving of the drive wheels 24. The wheels 24 are driven by a reversible electric motor 44 mounted upon the vehicle rear portion 14. It will be appreciated in FIGS. 1, 2 and 6 that the electric motor 44 extends under an overhanging portion 46 of the vehicle front portion to which the hinge elements 18 are attached. In this manner the overall length of the vehicle is minimized.

With reference to FIG. 6, the motor 44 includes an output shaft 48 having a pinion gear 50 fixed thereon which meshes with the larger gear 52 mounted in the transmission unit 54 on shaft 56. Through a universal drive connection the gear shaft 56 is connected to the shaft 58 and a bevel gear 60 affixed to the shaft 58 meshes with the gear 62 mounted on the drive wheel axle 64. In this manner rotation of the motor 44 will rotate the drive wheels 24 in a positive manner, and in a direction depending upon the direction of rotation of the motor.

In order to insure the highest possible friction between the drive wheels 24 and the lower region of the pipe inner surface, biasing means are provided on the rear portion 14 located directly above the drive wheel axle 64. As shown in FIGS. 6 and 12, the biasing means includes a plate 66 of a U-configuration, which rotatably supports a pair of wheels 68 adapted to engage the upper region of the pipe surface as will be appreciated from FIG. 12. The plate 66 is supported in spaced relationship to the top plate 70 of the rear portion 14 by means of screws 72 threaded into the transmission housing 74, and compression springs 76 interposed between the transmission housing and the underside of the plate 66. In this manner the springs 76 force the plate upwardly against the heads of the screws 72, and upon inserting the vehicle within the pipe to be surveyed, the springs 76 will be compressed and thereby impose a biasing force on the drive wheels 24 against the lower surface of the pipe 28 which will be in addition to the weight of the vehicle 10.

Normally, pipelines are linear in configuration for each section of "run." However, in addition to right angle turns, lesser deviations, usually at joints, such as in the order of 10°, also occur, and the vehicle of the invention is designed to permit traversing of turns or bends of less than 15°. To this end brackets 78 are mounted upon each side of the vehicle forward portion 12 as will be appreciated from FIGS. 1 through 3. The wheels 80 are rotatably mounted upon vertically disposed axes located in their respective brackets, and the wheels are mounted toward the rear of the forward portion at such a location that as the vehicle traverses a bend or deviation in the pipeline, one of the wheels 80, depending upon the direction of the turn, will engage the side of the pipe and produce pivoting of the portions 12 and 14 relative to each other about the pivot 16. This procedure will be described in greater detail in the following paragraphs.

Biasing means are mounted upon the portions 12 and 14 to tend to align the portions in a linear manner under the usual operating conditions, and this alignment means is best shown in FIGS. 6 and 7. A bracket 82 mounted upon the forward portion 12 comprises the support for a cover plate 84 which extends over the vehicle rear portion and transmission unit. A plurality of leaf springs 86 are also mounted upon the bracket 82 disposed under the cover plate, and the lowermost of the leaf springs 86 includes a downwardly disposed portion 88 which engages a spring steel rod 90 also rigidly mounted in the bracket 82. A V-shaped recess element 92 is mounted upon the vehicle rear portion 14 by screws, and includes an upper V surface 94, FIG. 7, which receives a roller 96 rotatably mounted on the rod 90. As the spring portion 88 bears upon the rod 90, the outer end of the rod is biased downwardly toward the element 92 in a very firm manner, and due to the V-configuration of the surface 94, the biasing force imposed on the rod tends to pivot the rear portion 14 in linear alignment behind the forward portion 12 to establish an aligned longitudinal relationship between the vehicle portions 12 and 14.

The rear mounted alignment member element 92 also includes stop surface 98 located at the ends of the surface 94 which will cooperate with the roller 96 and thus act as stops to limit angular deviation of the rear portion 14 with respect to the front portion 12. The roller 96 resting upon either of the obliquely disposed surfaces 94 imposes horizontally disposed vector forces on the rear portions 14 and this biasing force tending to align portions 12 and 14 may be overcome as the vehicle passes about a curve or through other pipeline deviation.

The steering of the vehicle is automatic, and as previously described, is accomplished through the energization of the electric motor 36. As a basic purpose of the steering is to maintain the vehicle properly oriented to the vertical, for gauging purposes, means are mounted upon the vehicle to sense the vertical orientation thereof. These means take the form of an electrical gravity sensitive device mounted in the nose of the forward portion 12. With reference to FIG. 5, this gravity device takes the form of a potentiometer 99 which includes a casing 100 filled with a dampening liquid. A pivot axis 102 supports a weighted pendulum 104 capable of pivoting laterally with respect to the length of the vehicle, and the pendulum includes a tap 106 in electrical engagement with the resistance coil 108 having terminals at each end and a center terminal 110. Thus, the conductors connected to pendulum 104, and the resistance coil 108 convey an electrical signal indicating the orientation of the vehicle to the vertical. The resistance coil terminal 110 is centrally located at the "zero" position, and engagement of the tap 106 on either side of the terminal 110 will indicate the direction of vehicle "tilting."

Figure 13:
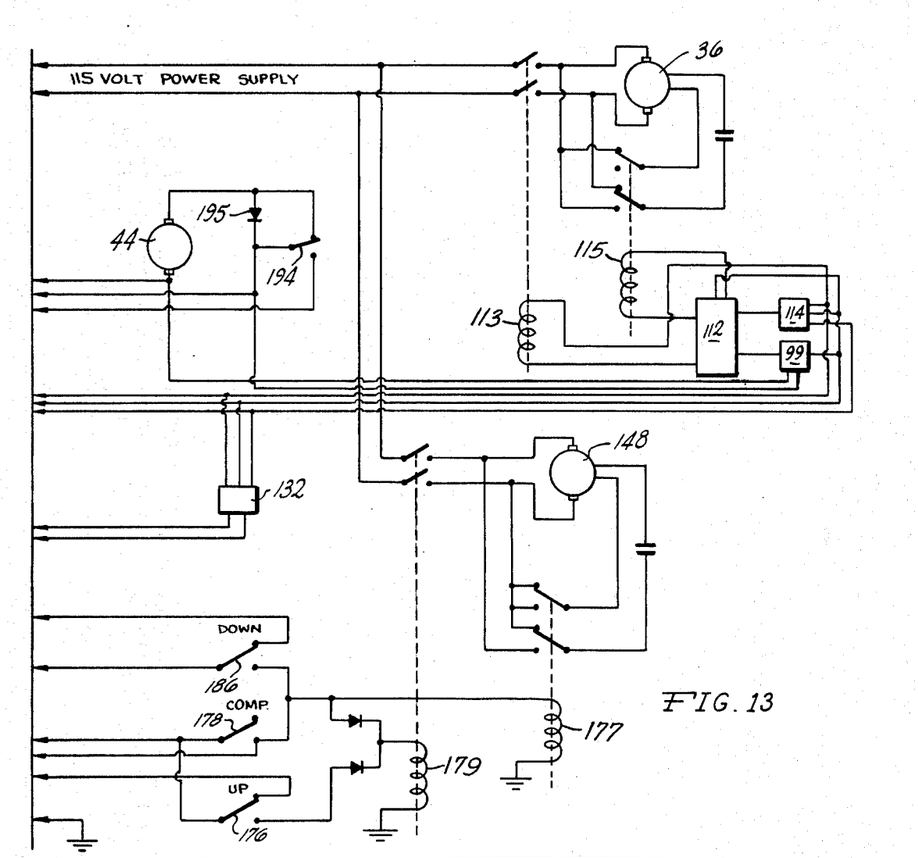
FIG. 13 is an electrical circuit diagram of the control system utilized with the vehicle.

The steering control circuit includes a comparitor 112 receiving an electrical signal from the vertical sensing device 99, and the electric motor 36 is connected to the comparitor 112 as will be appreciated from the circuit of FIG. 13. The comparator 112 controls motor 36 by a "start-stop" relay 113 and a reversing relay 115, FIG. 13.

Feedback of the steering mechanism is accomplished through the presence of the linear variable differential transformer 114 mounted upon the forward portion 12 behind the axle 26 as will be appreciated in FIGS. 2 and 9. The transformer 114 includes a core actuating rod 116, which is connected to the axle 26 radially spaced from the pivot axis 32 as will be appreciated from FIG. 9. Thus, as the axle is pivoted about its axis, the transformer core is moved within the transformer and the electrical connection between the transformer 114, comparitor 112 and electric motor 36 will therefore produce a steering of the vehicle tending to maintain the pendulum in the central "zero" position shown in FIG. 5 indicating that the vehicle is properly oriented to the vertical in the intended manner.

Figure 11:
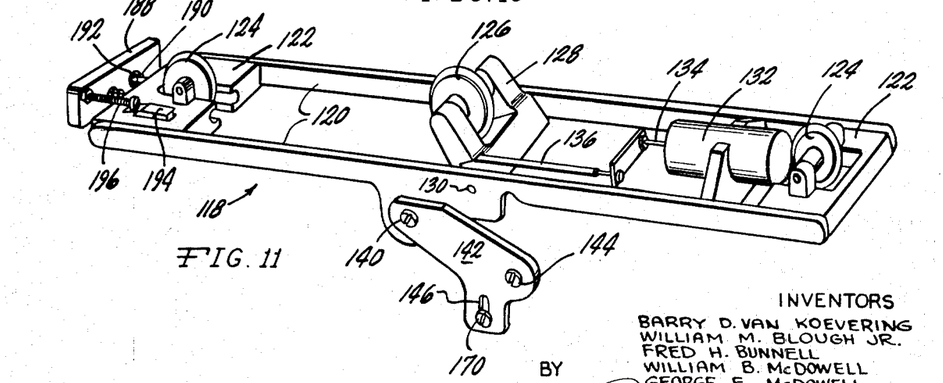
FIG. 11 is a perspective view of the gauge bar and the associated linkage.

As it is intended that the basic characteristic of the pipeline of which the disclosed survey vehicle will be sensing is the bending stress imposed on the pipe, gauging apparatus is mounted on the vehicle capable of performing this function. The basic gauging apparatus employed is illustrated in FIG. 11 wherein the gauge bar system is illustrated.

The gauge bar 118 consists of a pair of elongated elements 120 interconnected at their ends by plates 122. A gauge wheel or roller 124 is mounted on each of the plates 122 for rotation about a fixed axle axis which is transversely disposed to the length of the gauge bar, and the length of the vehicle, whereby the rollers 124 may engage the uppermost portion of the pipe inner surface, FIGS. 4 and 12, and roll thereon as the vehicle moves through the pipe.

A movable gauge wheel 126 is rotatably mounted in the central region of the gauge bar 118 upon a cradle 128 pivotally mounted on the elements 120 by a pivot shaft 130. The cradle 128 includes an axle for supporting the gauge wheel 126 on an axis which is transversely related to the vehicle length. A linear variable differential transformer 132 is mounted upon the gauge bar 118 having a core affixed to the core rod 134, which is in turn connected to the cradle 128 by a flexible connecting rod 136, at a location offset with respect to the cradle pivot axis 130. Thus, as the cradle 128 pivots about its axis as determined by the engagement of the wheel 126 with the uppermost portion of the pipe surface, the core of the transformer 132 will be shifted relative to the fixed transformer coils and produce an electrical signal which is indicative of the position of the wheel 126 and cradle. A spring, not shown, biases the cradle 128 clockwise to assure that the wheel 126 will properly engage the pipe during gauging.

In operation, the uppermost portion of all three of the wheels 124 and 126 will be engaging the uppermost portion of the pipe 28, and if no vertical deflection exists in the pipe, the uppermost portions of the gauge wheels will be in perfect linear alignment. If a sagging deflection exists in the pipe, the wheel 126 will be disposed slightly below the location of the wheels 124, and this deviation will be sensed by the transformer 132, which is electrically connected to indicating and recording apparatus at the control console. Thus, as the vehicle moves through the pipe, a continuous sensing of the pipe occurs. With reference to the aforeidentified patent, the principle of gauging in the instant invention is basically similar to that described therein.

The gauge bar 118 is adapted to be raised and lowered with respect to the vehicle forward portion 12, upon which the gauge bar is mounted. The vehicle forward portion includes a recess for receiving the gauge bar, and its associated structure as defined by side walls 138, FIG. 10. The gauge bar 118 is mounted upon pivots 140 which pass through slots 141 in side walls 138 and are mounted on bell cranks 142 which are in turn pivoted to the side walls 138 of the vehicle at 144. An elongated slot 146 is defined in each of the bell cranks for connection with the slide coupler, as will be described, to produce rotation of the bell cranks and thereby produce a raising and lowering of the gauge bar.

Figure 10:
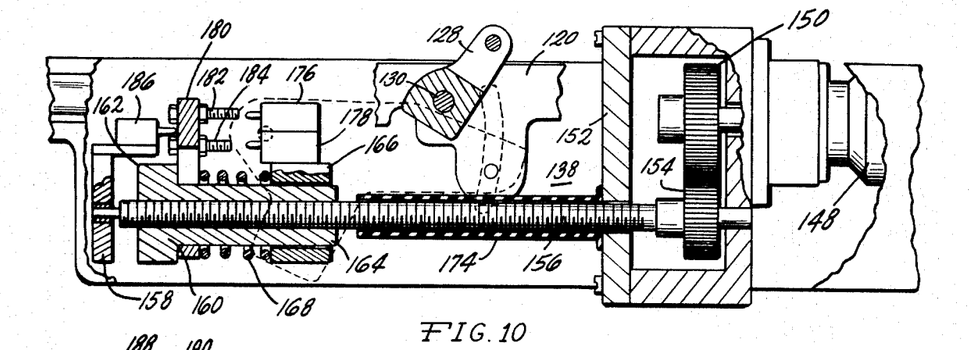
FIG. 10 is an enlarged, sectioned, elevational, detail view of the apparatus for raising and retracting the gauge bar.

The gauge bar raising and retracting is accomplished through a reversible electric motor 148, FIG. 10, which drives a gear 150 located in the transmission 152. The gear 150 meshes with the gear 154 mounted upon the threaded shaft 156 which is rotatably supported at its rearmost location in a bearing block 158, FIG. 10. A nut 160 is threaded upon the shaft 156 and includes an enlarged rectangular portion 162, and an axially extending portion 164 of reduced cylindrical configuration. A slide coupler 166 is slidably mounted upon the nut extension 164 and a compression spring 168 is interposed between the enlarged nut portion 162 and the slide coupler to bias the coupler to the right, FIG. 10. At the same time the slide coupler 166 is biased to the left in FIG. 10 by the weight of the gauge bar 118 acting through the bell cranks 142 about pivot 144 and through screws 170. The screws 170 are mounted in the coupler 166 and extend through the horizontal slots 172, FIGS. 1 and 2, defined in the vehicle side walls 138 for sliding contact with the associated slot 172 and for cooperation with the bell crank slots 146 whereby forward and rear movement of the coupler 166 produces the pivoting of the bell cranks 142 about pivots 144 to raise and lower the gauge bar. The slots 172 limit movement of coupler 166 upon nut extension 164. A protective covering 174 for the threaded shaft 156 may be disposed over the exposed portion of the shaft.

A pair of limit switches 176 and 178 are mounted upon the slide coupler 166, and a bracket 180 located on the nut 160 supports screws 182 and 184 which function as the actuators for the limit switches 176 and 178, respectively. Also, a limit switch 186 is mounted upon the bearing block 158 for engagement with the bracket 180 to limit retraction of the gauge bar.

The limit switch 176 comprises the "up" limit switch wherein rotation of the motor 148 to rotate the shaft 156 to move the nut 160 to the right, FIG. 10, will cause the bell cranks 142 to pivot in a counterclockwise direction, FIG. 10, to raise the gauge bar 118. It will be appreciated that during the lifting of the gauge bar that the force imposed upon the slide coupler 166 by the nut 160 is transmitted through the spring 168. Upon the gauge bar wheels 124 engaging the upper portion of the pipe, upward movement of the gauge bar is terminated and the spring 168 begins to compress due to the cessation of movement of the slide coupler. Upon sufficient compression of the spring 168 the actuator screw 182 will engage the limit switch 176 and de-energize the motor 148.

If it is desired to lower the gauge bar 118 the electric motor 148 is rotated in the direction which moves the nut 160 to the left, FIG. 10, and the weight of the gauge bar will rotate the bell cranks 142 in a clockwise direction, FIG. 10, causing the gauge bar to lower, and this action continues until the limit switch 186 is encountered by the nut bracket 180 to de-energize the motor.

As the vehicle is moving through the pipe with the gauge bar in the "up" position so that the gauge rollers 124 and 126 are engaging the pipe, it is possible that the internal vertical dimension of the pipe may temporarily change so as to impose a downward force on the gauge bar 118. This action may occur from the existence of an accumulation of dirt in the pipe, the passing over of the vehicle of a seam in the pipe, or the turning of a corner. In such instance, the externally applied downward pressure on the gauge bar 118 causes the spring 168 to be further compressed which engages the limit switch 178 with its actuating screw 184 to reverse the direction of the motor 148 to lower the gauge bar. This lowering occurs until the excessive pressure on the gauge bar is reduced, resulting in the extending of the spring 168 to reestablish the desired spacing between the slide coupler 166 and the nut 160 desired during normal operation of the apparatus as determined by the limit switch 176. Upon this condition being achieved, the downward movement of the gauge bar ceases and since the circuit energizing the "up" switch 176 remains activated, the gauge bar will be raised as soon as the condition causing the excessive downward pressure on the gauge bar has been passed. In this manner a uniform force is maintained on the gauge bar in an upward direction by the spring 168, and a binding or excessive application of force to the gauge bar is prevented.

As will be appreciated in FIG. 13 the switches 176, 178 and 186 control motor 148 through a reversing relay 177 and an "up and down" relay 179.

The service connections into a 4 inch or a 6 inch gas main often protrude a short length through the upper surface thereof, and in order to sense the presence of this type of protrusion, a "feeler" plate 188 is slidably mounted upon the gauge bar forward end by guide pins 190 and biased forwardly by springs 192, FIG. 11. Should the plate 188 engage an overhead obstruction, the plate will be biased rearwardly causing an actuation of the switch 194 by the switch actuator 196 mounted upon the plate. Such an actuation of the switch 194 immediately de-energizes the drive motor 44 to stop the vehicle movement, and the gauge bar 118 may then be lowered and, the drive wheels motor again energized, by the control console operator and the vehicle may be moved past the obstruction before the gauge bar is again raised. Diode 195 permits motor 44 to be reversed, if necessary, upon an obstacle being encountered by reversing polarity on the top leads, FIG. 13.

Traversing of the vehicle about a deviation or bend in the pipe will now be described. Assuming that a right turn of the vehicle is to be accomplished, the front of the vehicle 10 will enter the offset section of a pipe producing the deviation and the left front wheel 22 begins to ride up the side of the pipe 28. The vehicle then tends to rotate clockwise about its longitudinal axis as viewed from the rear and this rotation causes the pendulum 104 to produce a positive signal which is received by the comparitor 112 which compares the received signal to the reference signal derived from the linear variable differential transformer 114. When the difference of these two signals is great enough to exceed the preset difference threshold of the apparatus, then the comparitor by means of relay 113 located in the vehicle rear portion 14 energizes the steering motor 36. The steering motor turns the front wheel so that the vehicle starts to turn right. As the steering wheels make a right turn the mechanical linkage with the linear variable differential transformer 114 moves the core of the transformer to change the reference signal from the transformer received by the comparitor. This process continues until the wheel position achieves corrective agreement with the command off vertical signal from the gravity sensing device 99, or until it reaches its furtherest limit of steering.

As the vehicle continues the right turn, this process continues to repeat itself. When the vehicle is approximately half way through the deviation, the right rear side of the forward portion 12 approaches the pipe wall side, and thereby engages the right wheel 80 against the pipe wall. The wheel 80 engaging the pipe wall causes the vehicle to hinge at the pivot 16, which partially relieves the steering requirements at the front end of the vehicle. At this point the rear portion 14 of the vehicle is askew and points left. The left rear wheel tends to climb up the left pipe wall, however, the spring pressure produced by the biasing springs 76 maintains engagement of both of the rear wheels with the pipe surface. This tendency to rotate the vehicle causes further actuation of the pendulum 104 and the steering system again acts to keep the vehicle properly oriented to the vertical. As the wheel 80 passes the apex of the pipeline deviation the rear vehicle portion 14 is relieved of its askewed tendency, and a tendency for the vehicle to pivot about its longitudinal axis in the opposite direction occurs, which is compensated for by the pendulum potentiometer 99 and the resultant steering control. Thus, it will be appreciated that the side wheels 80 tend to prevent a binding of the vehicle as it traverses deviations in the pipe, and also aids in deflecting the vehicle portions about the pivot 16 against the biasing produced by the spring rod 90 and the associated leaf springs. Once the vehicle is completely received within a linear portion of the pipe, the spring rod 90 will "straighten out" the rear portion 14 with respect to the forward portion 12.

Figure 14:
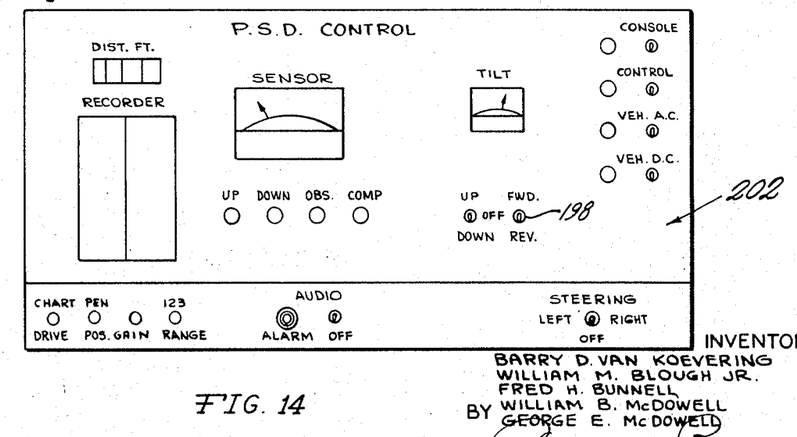
FIG. 14 illustrates the vehicle control console.

When the vehicle is being reversed, by reversing the direction of rotation of the drive motor 44 to "back" the vehicle 10 from the pipe, the reversing switch 198, FIG. 14 is shifted to reverse the direction of rotation of steering motor 36 with respect to the signal received from the comparitor 112, and thereby permit automatic steering as the vehicle is driven in a reverse direction.

Control and power of the vehicle is achieved by means of a multiconductor control cord affixed to the vehicle at the terminal 200. This control cord extends between the vehicle and the control console 202, FIG. 14. The console panel 20 will be located upon a truck, or other conveyance disposed adjacent the entrance to the pipe through which the vehicle is inserted. As will be noted in FIG. 14, the console 202 includes a recorder for continuously recording the output of transformer 132 and other pilot lights, and gauges and controls indicate the functioning and state of the vehicle components.

With known technology, it is possible to insert the vehicle 10 in a pipeline having natural gas therein under pressure and the gauging of the pipeline may occur in a pipe which is in service. Of course, the electrical devices of the survey vehicle are explosion proof to permit this type of operation.

It is also contemplated that by the placing of batteries in the vehicle, and the use of radio equipment, the need for the control cord between the console 202 and the vehicle 10 could be eliminated. While this structure would necessitate a larger vehicle than that disclosed, it is considered that the technology to produce this type of embodiment is within the scope of one skilled in the art.

While the disclosed embodiment of the vehicle illustrates the presence of apparatus for sensing bending of the pipe in a vertical plane, other types of pipeline characteristics sensing means may be mounted upon the vehicle, either in addition to the shown gauging apparatus, or in lieu thereof, if other characteristics are to be sensed. For instance, the vehicle may be used for leak detection purposes by mounting a very sensitive microphone 204 upon the vehicle, as shown in FIG. 15. The sensitivity of the microphone can be augmented by the utilization of a parabolic reflector segment 206 which focuses and directs the sound received from a leak toward the microphone 204. It is contemplated that other types of pipe characteristic sensing equipment, such as temperature indicating apparatus, magnetic testing transducers, X-ray equipment, or the like may be mounted upon the vehicle if desired. The self-propelled and self-steering characteristics of the vehicle make it very versatile and dependable in operation, and merely by making variations in dimensions the vehicle may be adapted for various sizes of conduits.

It is appreciated that modifications may be apparent to those skilled in the art without departing from the spirit and scope of the invention, for instance, endless tracks may be substituted for the drive wheels.

We claim:

1. Pipeline survey apparatus for internally sensing the characteristics of a horizontal pipeline, in situ, having a longitudinal axis, comprising, in combination, a vehicle, rotatable supporting means mounted on said vehicle for supporting said vehicle for movement through a pipe, steering means mounted on said vehicle for steering said vehicle within the pipe and orienting said vehicle to the vertical plane in which the pipe longitudinal axis lies as it moves through the pipe, sensing means mounted on said vehicle sensing the orientation of said vehicle to said vertical plane, steering control means connected to and operating said steering means, said sensing means being connected to and controlling said steering control means in accord with the orientation of said vehicle to said vertical plane as sensed and indicated by said sensing means, and vertically disposed gaging means mounted on said vehicle for gaging the vertical contour of the inner surface of the pipeline.

2. In pipeline survey apparatus as in claim 1 wherein said sensing means comprises a gravity actuated member movable under the influence of gravity, and means sensing and indicating the position of said gravity actuated member with respect to the vertical.

3. In pipeline survey apparatus as in claim 1 wherein said steering means comprises at least one rotatable pipe engaging wheel mounted on said vehicle steerably pivotable about a substantially vertical axis, and said steering control means includes a motor mounted on said vehicle steerably connected to said wheel.

4. In pipeline survey apparatus as in claim 1, said steering means including a steering axle pivotally mounted upon said vehicle about a substantially vertical axis, a pair of wheels rotatably mounted on said axle, and said steering control means including an electric steering motor mounted on said vehicle in driving connection with said axle for pivoting said axle about said axis.

5. In pipeline survey apparatus as in claim 1, a vehicle drive motor mounted on said vehicle in driving relationship with said rotatable vehicle supporting means wherein said vehicle is self-propelled.

6. In pipeline survey apparatus as in claim 5 wherein said rotatable vehicle supporting means includes a pair of drive wheels rotatably mounted on said vehicle, drive train transmission means connected to said drive wheels, said drive motor comprising an electric motor drivingly connected to said transmission means whereby said transmission connects said electric motor to said drive wheels.

7. In pipeline survey apparatus as in claim 6, pipe engaging biased means mounted on said vehicle vertically disposed above said drive wheels, and biasing means biasing said biased means whereby said biased means interiorly engages the pipe upper regions and biases the vehicle drive wheels into engagement with the pipe lower regions to increase the frictional engagement between said drive wheels and the pipe.

8. In pipeline survey apparatus as in claim 1, said vehicle comprising a forward portion and a rear portion, and pivot means interconnecting said forward and rear portions whereby said vehicle is articulated.

9. In pipeline survey apparatus as in claim 8 wherein said rotatable vehicle supporting means comprise steerable wheels rotatably mounted upon said forward portion and drive wheels rotatably mounted on said rear portion, and an electric motor mounted upon said vehicle rear portion drivingly connected to said drive wheels.

10. Pipeline survey apparatus for internally sensing the characteristics of a horizontal pipeline, in situ, the pipe having a longitudinal axis and an inner surface having upper and lower regions comprising, in combination, a vehicle having sides and forward and rear portions, vehicle supporting wheels rotatably mounted upon said vehicle supporting said vehicle upon the pipe lower regions, said wheels including a pair of drive wheels, a motor mounted on said vehicle drivingly connected to said drive wheels, biased means mounted on said vehicle for engaging the pipe upper region to bias said drive wheels into frictional engagement with the pipe lower region, and pipeline characteristic sensing means mounted on said vehicle.

11. In a pipeline survey apparatus as in claim 10, pivot means defining a substantially vertical axis interconnecting said forward and rear vehicle portions whereby said portions may pivot relative to each other to facilitate movement about horizontal pipeline deviations from the linear.

12. In pipeline survey apparatus as in claim 11, at least one guide member mounted on each side of said vehicle forward portion adjacent said rear portion for engagement with the pipeline inner surface intermediate said upper and lower regions upon said vehicle traversing horizontal pipeline deviations from the linear.

13. In pipeline survey apparatus as in claim 11, resilient alignment means interposed between said vehicle forward and rear portions imposing a biasing force on said portions tending to establish linear alignment of said vehicle portions.

14. In pipeline survey apparatus as in claim 10 wherein said vehicle supporting wheels include steerable wheels mounted upon said forward portion, gravity operated sensing means mounted on said forward portion sensing the orientation of said vehicle to the vertical, and steering means connected to and controlling said steerable wheels, said gravity operated sensing means being connected to said steering means and controlling said steerable wheels in accord with the orientation of said vehicle to the vertical as sensed and indicated by said sensing means.

15. Pipeline survey apparatus for internally sensing the characteristics of a horizontal pipeline, in situ, having a longitudinal axis and an inner surface having upper and lower regions comprising, in combination, a self-propelled vehicle having pipe engaging supporting and drive means mounted thereon, motor means mounted on said vehicle drivingly connected to said drive means, an elongated moveable gauge bar mounted on said vehicle, means mounted on said vehicle for raising and lowering said gauge bar thereon between upper and lower limits, pipeline engaging elements mounted on said bar, controllable power means for raising and lowering said bar relative to said vehicle for selective engagement of said pipeline engaging elements with the pipeline upper region, first gauge bar positioning control means sensing the position of said gauge bar and controlling said power means to move said bar between its upper and lower limits, one of said pipeline engaging elements being movable with respect to said gauge bar to sense deviations in the pipeline in the vertical plane, and indicating means connected to said movable element sensing and indicating the position of said movable element relative to said gauge bar.

16. In pipeline survey apparatus as in claim 15, obstruction sensing means mounted upon said vehicle for engagement with obstructions located within the pipeline upper region and control means connecting said obstruction sensing means to said motor means to de-energize said motor means upon an obstruction being encountered after said motor has been energized to propel said vehicle.

17. In pipeline survey apparatus as in claim 15, lost motion means interposed between said gauge bar and said controllable power means, second gauge bar position control means mounted on said vehicle sensing deflection of said gauge bar downwardly from an upper position under the influence of external forces and control means connecting said second gauge bar position control means to said power means to energize said power means to lower said gauge bar upon said gauge bar being externally forced downwardly.

* * * * *